(12) United States Patent
Lee

(10) Patent No.: US 7,651,119 B2
(45) Date of Patent: Jan. 26, 2010

(54) AIR BAG APPARATUS

(75) Inventor: Chang Hyun Lee, Yongin (KR)

(73) Assignee: Hyundai Motor Company, Seoul (KR)

( * ) Notice: Subject to any disclaimer, the term of this patent is extended or adjusted under 35 U.S.C. 154(b) by 329 days.

(21) Appl. No.: 11/642,449

(22) Filed: Dec. 20, 2006

(65) Prior Publication Data
US 2008/0116668 A1   May 22, 2008

(30) Foreign Application Priority Data
Nov. 16, 2006   (KR) .................... 10-2006-0113499

(51) Int. Cl.
*B60R 21/203* (2006.01)
(52) U.S. Cl. .................... 280/728.2; 280/731
(58) Field of Classification Search ............. 280/728.2, 280/731, 740, 741
See application file for complete search history.

(56) References Cited

U.S. PATENT DOCUMENTS

| | | | | |
|---|---|---|---|---|
| 4,828,286 A | * | 5/1989 | Fohl | 280/731 |
| 5,584,501 A | * | 12/1996 | Walters | 280/728.2 |
| 6,942,246 B2 | * | 9/2005 | Hohne et al. | 280/731 |
| 7,063,348 B2 | * | 6/2006 | Webber et al. | 280/728.2 |
| 7,100,940 B2 | * | 9/2006 | Kahler et al. | 280/728.2 |
| 7,131,661 B2 | * | 11/2006 | Webber et al. | 280/728.2 |
| 7,246,816 B2 | * | 7/2007 | Lorenz et al. | 280/728.2 |
| 7,331,599 B2 | * | 2/2008 | Laue et al. | 280/728.2 |

FOREIGN PATENT DOCUMENTS

KR   10-2004-0088668 A   10/2004

* cited by examiner

*Primary Examiner*—Paul N Dickson
*Assistant Examiner*—Nicole Verley
(74) *Attorney, Agent, or Firm*—Morgan, Lewis & Bockius LLP

(57) ABSTRACT

An air bag apparatus includes: a supporting plate; an air bag case mounted on the supporting plate such that a space is formed therein; an air bag cushion installed in the space and attached to the supporting plate; an inflator for supplying a gas to the air bag cushion, the inflator being mounted at the supporting plate; and a clamping device for clamping a middle portion of the air bag cushion, the clamping device being coupled with the supporting plate. The inflator may supply the gas to side portions of the air bag, such that the side portions expand for a predetermined time while the middle portion is clamped by the clamping device, and when the inflating force of the air bag overcomes the clamping force, the middle portion expands.

5 Claims, 4 Drawing Sheets

AIR BAG APPARATUS

CROSS-REFERENCE TO RELATED APPLICATION

This application claims priority to and the benefit of Korean Patent Application No. 10-2006-0113499 filed in the Korean Intellectual Property Office on Nov. 16, 2006, the entire contents of which are incorporated herein by reference.

BACKGROUND OF THE INVENTION (a) Field of the Invention

The present invention relates to an air bag apparatus. More particularly, the present invention relates to an air bag apparatus that smoothly inflates an air bag cushion.

(b) Description of the Related Art

A conventional air bag apparatus includes a base plate mounted on a steering wheel, a supporting plate mounted on the base plate, and an air bag case mounted on the supporting plate such that a space is formed therein. An air bag cushion is installed in the space of the air bag case, and is attached to the supporting plate. A gas hole is formed in the air bag cushion.

When an accident occurs, an air bag control unit (ACU) sends an accident signal to an inflator, which supplies gas to the air bag cushion. Thus, the air bag cushion expands.

Operation of an air bag apparatus is controlled according to collision type and collision speed. Generally, a time required from when a collision occurs to when the ACU determines that the collision has occurred is 10-30 ms, and a time required from when an accident signal is generated to when an air bag expands fully is 30-40 ms.

If an occupant sits abnormally close to the air bag apparatus or leans forward at a sudden stop, the occupant contacts the air bag cushion while it is still expanding. Therefore, the air bag applies a high load to the occupant, and thus, the occupant may be injured.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides an air bag apparatus that prevents a middle portion of the air bag cushion from quick expansion.

An air bag apparatus according to an exemplary embodiment of the present invention includes: a supporting plate; an air bag case mounted on the supporting plate such that a space is formed therein; an air bag cushion installed in the space and attached to the supporting plate; an inflator for supplying a gas to the air bag cushion, the inflator being mounted at the supporting plate; and a clamping device for clamping a middle portion of the air bag cushion, the clamping device being coupled to the supporting plate.

The inflator may supply the gas to a side portion of the air bag cushion.

The middle portion of the air bag cushion may expand after the side portion of the air bag cushion has substantially expanded.

The clamping device may include a connecting plate coupled to the supporting plate, and a pair of clamps mounted on the connecting plate and clamping the middle portion of the air bag cushion.

The pair of clamps may be a pair of plates inclined inwardly so as to clamp the middle portion of the air bag cushion for a predetermined time when the inflator supplies the gas to the air bag cushion.

Alternatively, upper portions of the clamps may be bent outwardly and the air bag cushion may be clamped between the connecting plate and the upper portions of the clamps.

Alternatively, the clamping device may include a connecting plate coupled to the supporting plate, and a single hollow, tapered clamp mounted on the connecting plate.

DETAILED DESCRIPTION OF THE PREFERRED EMBODIMENTS

Exemplary embodiments of the present invention will hereinafter be described in detail with reference to the accompanying drawings.

Figure 1:
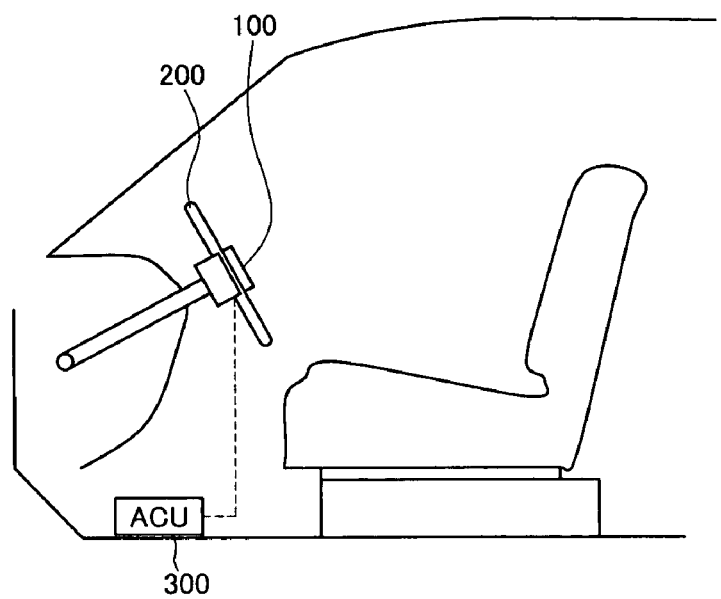
FIG. 1 is a schematic diagram of an air bag apparatus according to an exemplary embodiment of the present invention installed in a vehicle.

As shown in FIG. 1, an exemplary air bag apparatus 100 according to an embodiment of the present invention is mounted on a steering wheel 200 of a vehicle. Operation of the air bag apparatus 100 is controlled by an air bag control unit 300.

Figure 2:
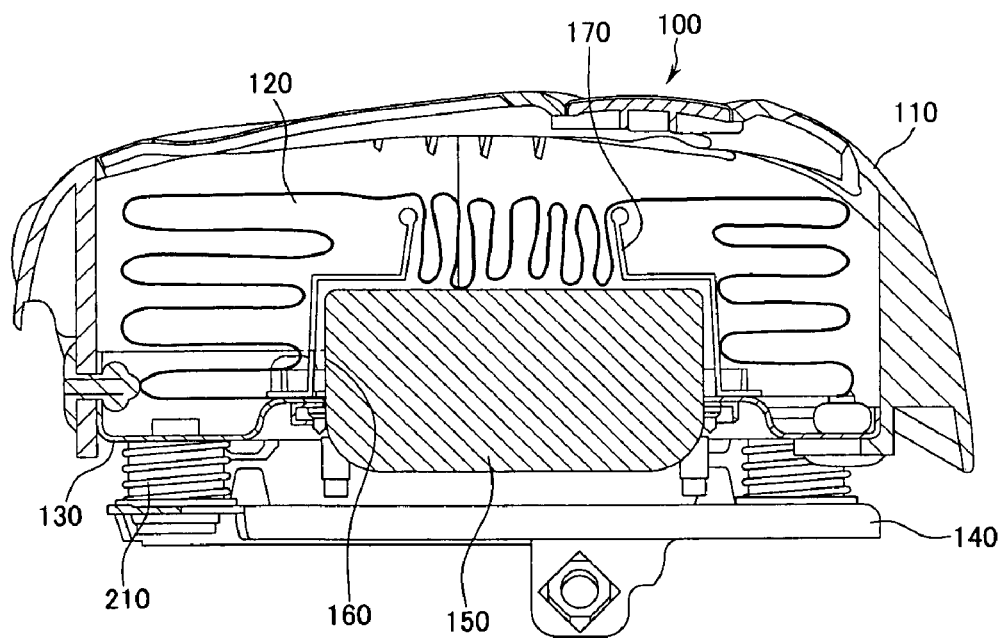
FIG. 2 is a cross-sectional view of an air bag apparatus according to an exemplary embodiment of the present invention.

As shown in FIG. 2, the air bag apparatus 100 according to an exemplary embodiment of the present invention includes a base plate 140, a supporting plate 130, an air bag case 110, an air bag cushion 120, an inflator 150, and a clamping device 170.

The base plate 140 is mounted on a middle portion of the steering wheel 200 of the vehicle.

The supporting plate 130 is mounted on the base plate 140. An elastic member 210 is interposed between the supporting plate 130 and the base plate 140 to reduce impact applied to the supporting plate 130 when the air bag cushion 120 expands. The supporting plate 130 is bolted to the base plate 140.

In addition, a hole is formed in the supporting plate 130 and the inflator 150 is mounted in the hole.

The air bag case 110 is mounted on the supporting plate 130. A space is formed in the air bag case 110. The inflator 150, the clamping device 170, and the air bag cushion 120 are installed in the space. The air bag case 110 may be made from a plastic.

The air bag cushion 120 is attached to the supporting plate 130 so as not to be detached from the supporting plate 130 when the air bag cushion 120 expands. A gas hole 160 is formed at the air bag cushion 120 and the inflator 150 supplies the gas to the air bag cushion 120 through the gas hole 160.

In addition, the air bag cushion 120 has a middle portion, which is clamped by the clamping device 170, and side portions.

The inflator 150 is mounted on the supporting plate 130. When the inflator 150 receives an accident signal from the air bag control unit 300, the inflator 150 supplies gas to the air bag cushion 120.

The inflator 150 may supply the gas to the side portions of the air bag cushion 120. Therefore, the side portions of the air bag cushion 120 expand, and then the middle portion of the air bag 120 expands.

The clamping device 170 is coupled with the supporting plate 130, and is mounted on the inflator 150. The clamping device 170 clamps the middle portion of the air bag cushion 120. Therefore, when gas is supplied to the side portions of the air bag cushion 120 from the inflator 150, the side portions of the air bag cushion 120 expand for a predetermined time, during which the middle portion of the air bag cushion 120 does not expand because of the clamping force of the clamping device 170. After that, if an expansion force of the air bag cushion 120 is larger than the clamping force of the clamping device 170, the middle portion of the air bag cushion 120 expands. Therefore, an expansion process of the air bag cushion 120 is controlled by controlling the clamping force of the clamping device 170.

Figure 3:
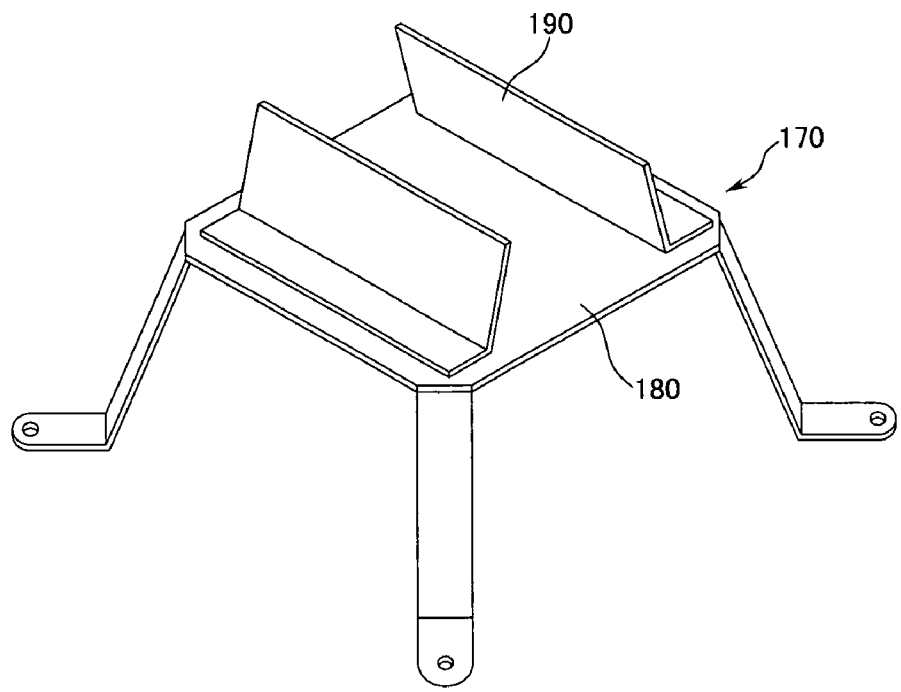
FIG. 3 is a perspective view of a clamping device that is used in an air bag apparatus according to an exemplary embodiment of the present invention.

As shown in FIG. 3, in a first embodiment, the clamping device 170 includes a connecting plate 180 that is coupled with the supporting plate 130, and a pair of clamps 190 that are mounted on the connecting plate 180. The clamps 190 clamp the middle portion of the air bag cushion 120. The pair of clamps 190 may be metal plates.

The pair of clamps 190 are inclined inwardly so as to clamp the middle portion of the air bag cushion 120 for the predetermined time when the inflator 150 supplies the gas to the air bag cushion 120. The clamping force of the clamping device 170 is proportional to the tilt angle of the clamps 190.

If the expansion force of the air bag cushion 120 is larger than the clamping force of the clamping device 170, the clamps 190 are opened and the middle portion of the air bag cushion 120 expands.

Figure 4:
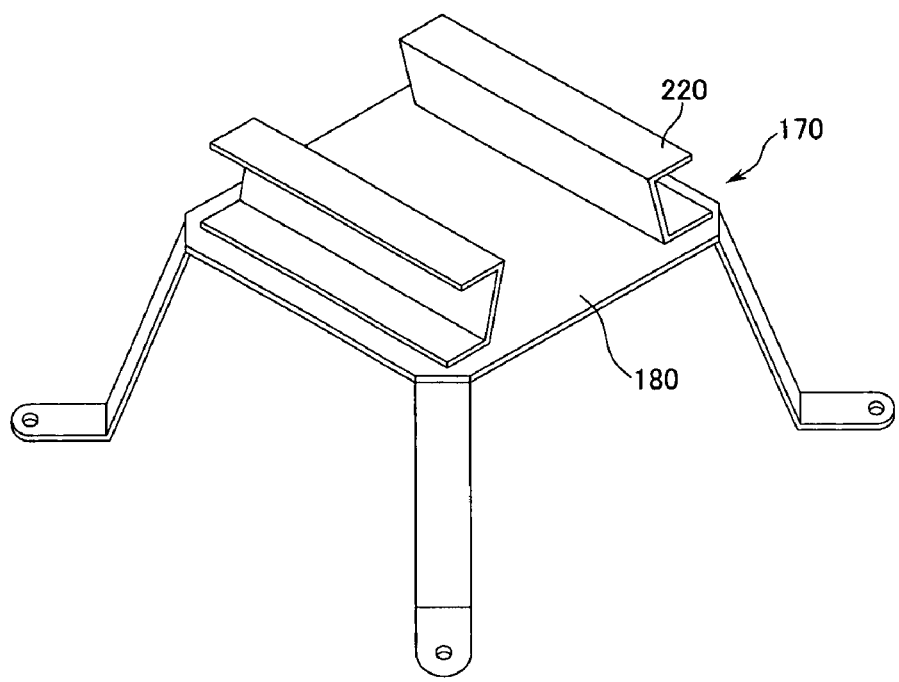
FIG. 4 is a perspective view of a clamping device that is used in an air bag apparatus according to another exemplary embodiment of the present invention.

As shown in FIG. 4, a clamping device 170 according to a second exemplary embodiment of the present invention includes a connecting plate 180 that is coupled with the supporting plate 130 and a pair of clamps 220 that are mounted on the connecting plate 180. Upper portions of the clamps 220 are bent outwardly, and the air bag cushion 120 is clamped between the connecting plate 180 and the upper portions of the clamps 220.

Figure 5:
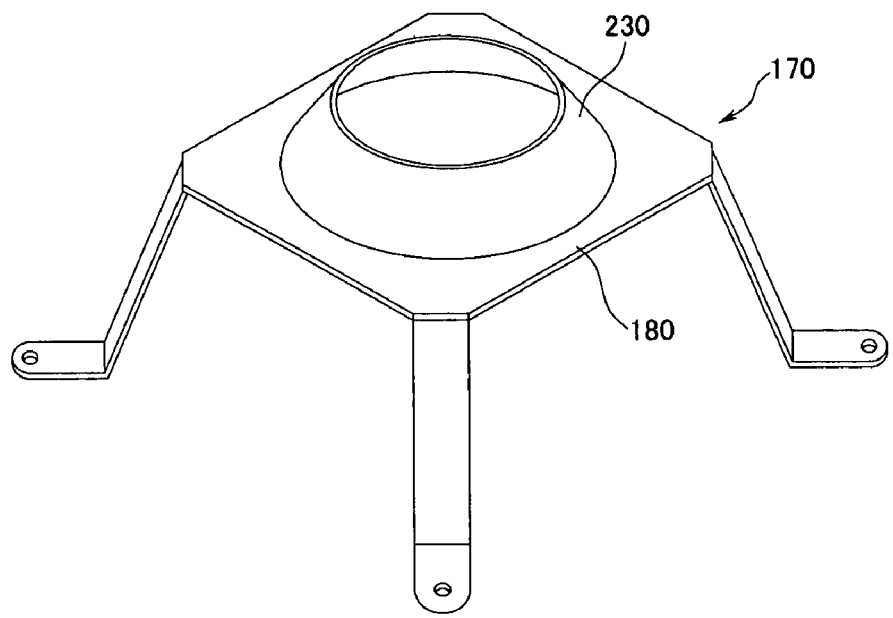
FIG. 5 is a perspective view of a clamping device that is used in an air bag apparatus according to another exemplary embodiment of the present invention.

As shown in FIG. 5, a clamping device 170 according to a third exemplary embodiment of the present invention includes a connecting plate 180 that is coupled with the supporting plate 130, and a hollow, tapered clamp 230 that is mounted on the connecting plate 180. The middle portion of the air bag cushion 120 is inserted in and clamped by the tapered clamp 230.

Hereinafter, operation of the air bag apparatus according to the embodiment of the present invention will be described in detail.

Figure 6:
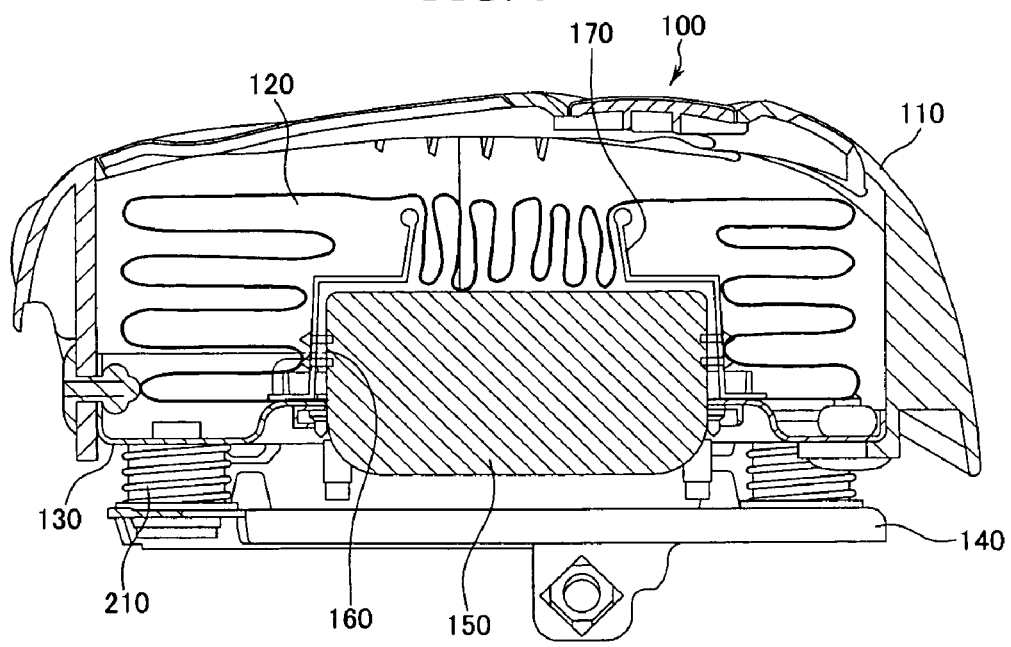
FIG. 6 is a cross-sectional view showing a gas initially supplied from an inflator to an air bag cushion according to an exemplary embodiment of the present invention.

As shown in FIG. 6, when an accident occurs, the air bag control unit 300 transmits an accident signal to the inflator 150, which supplies gas to the side portions of the air bag cushion 120 through the gas hole 160.

Figure 7:
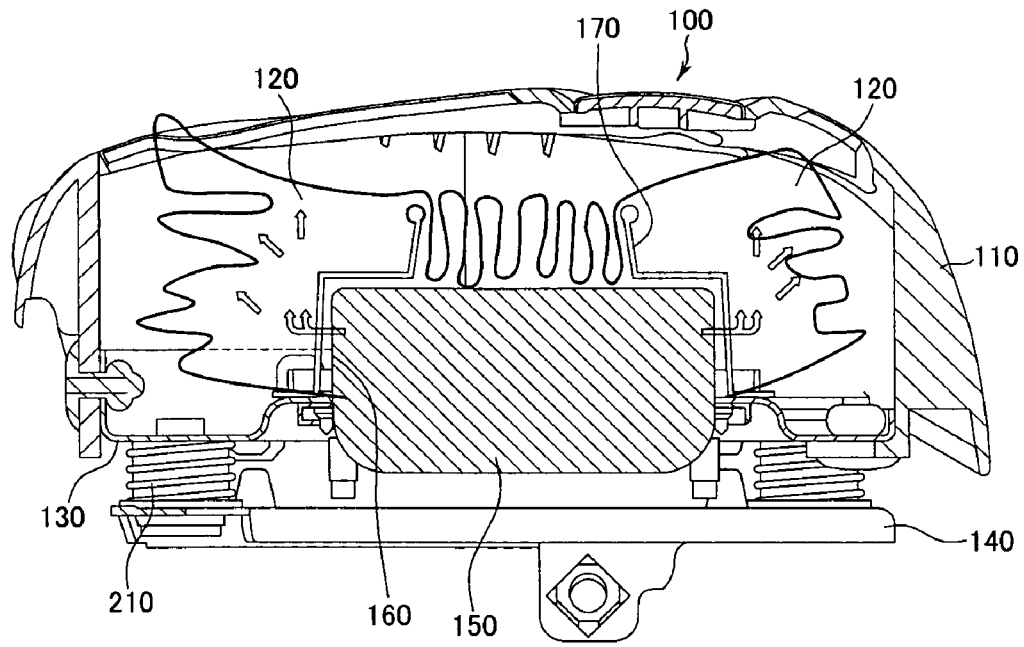
FIG. 7 is a cross-sectional view showing a side portion of an air bag cushion expanding according to an exemplary embodiment of the present invention.

Then, as shown in FIG. 7, the side portions of the air bag cushion 120 expand, but the middle portion of the air bag cushion 120 that is clamped by the clamping device 170 does not expand for the predetermined time.

Figure 8:
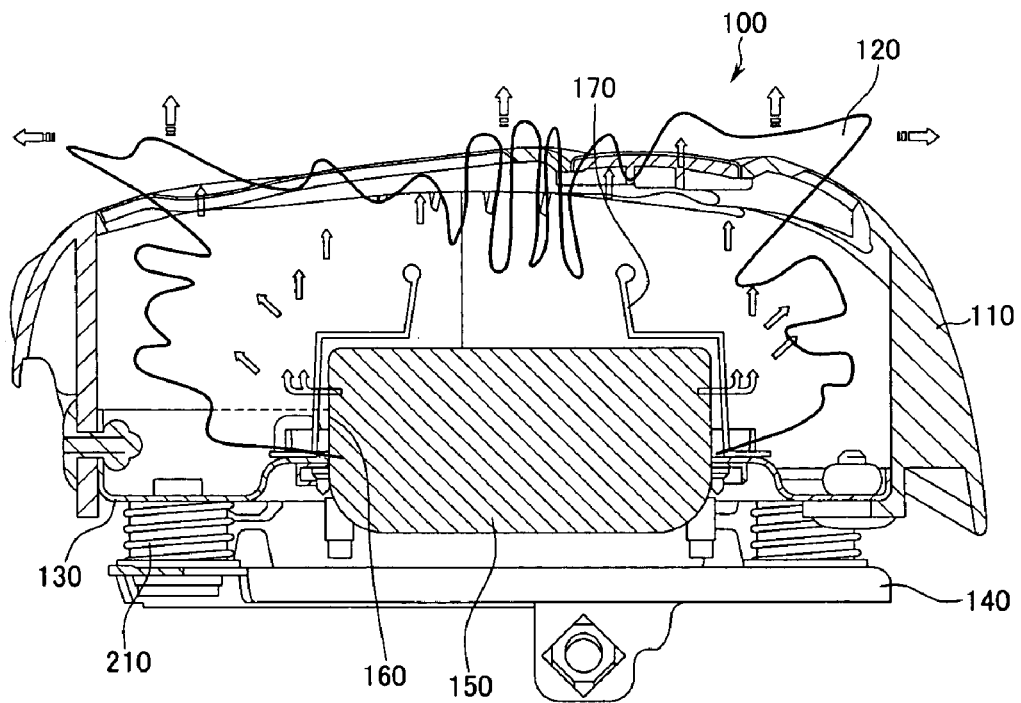
FIG. 8 is a cross-sectional view showing an entire air bag cushion expanding according to an exemplary embodiment of the present invention.

After that, if the expansion force of the air bag cushion 120 is larger than the clamping force of the clamping device 170, the clamping device 170 is opened and the middle portion of the air bag cushion 120 expands, as shown in FIG. 8.

In this case, since the air bag cushion 120 does not expand toward an occupant but evenly expands toward every direction, impact applied to the occupant may be reduced.

According to the present invention, an air bag cushion may expand evenly toward every direction by clamping a middle portion of the air bag for a predetermined time. In addition, the middle portion of the air bag cushion may not expand quickly. Therefore, impact applied to an occupant from the air bag cushion may be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An air bag apparatus, comprising:
    a supporting plate;
    an air bag case mounted on the supporting plate such that a space is formed therein;
    an air bag cushion installed in the space and attached to the supporting plate;
    an inflator for supplying a gas to the air bag cushion, the inflator being mounted to the supporting plate; and
    a clamping device for releasably clamping a middle portion of the air bag cushion, the clamping device being coupled with the supporting plate;
    wherein the inflator supplies the gas to a side portion of the air bag cushion; and
    wherein the middle portion of the air bag cushion that is clamped by the clamping device expands after the side portion of the air bag cushion when the gas is supplied to the air bag cushion.

2. The apparatus of claim 1, wherein the clamping device comprises:
    a connecting plate coupled with the supporting plate; and
    a pair of clamps mounted on the connecting plate and clamping the middle portion of the air bag cushion.

3. The apparatus of claim 2, wherein the pair of clamps are a pair of plates inclined inwardly.

4. The apparatus of claim 2, wherein upper portions of the clamps extend outwardly and the air bag cushion is clamped between the connecting plate and the upper portions of the clamps.

5. The apparatus of claim 1, wherein the clamping device comprises:
    a connecting plate coupled with the supporting plate; and
    a tapered clamp mounted on the connecting plate.

* * * * *